June 16, 1953 — M. BERESIN — 2,641,838
DENTAL ARTICULATOR
Filed Jan. 22, 1951 — 4 Sheets-Sheet 1

*INVENTOR.*
MORRIS BERESIN
BY Caesar and Rivise
ATTORNEYS

June 16, 1953    M. BERESIN    2,641,838
DENTAL ARTICULATOR
Filed Jan. 22, 1951    4 Sheets-Sheet 2
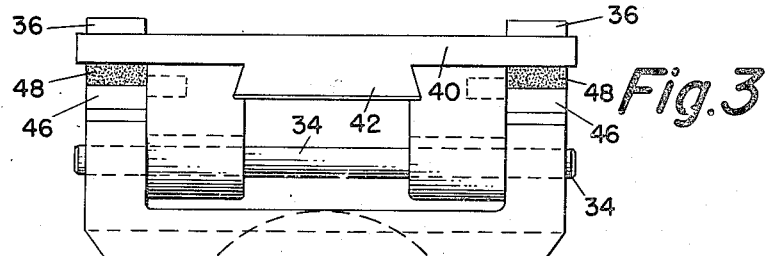
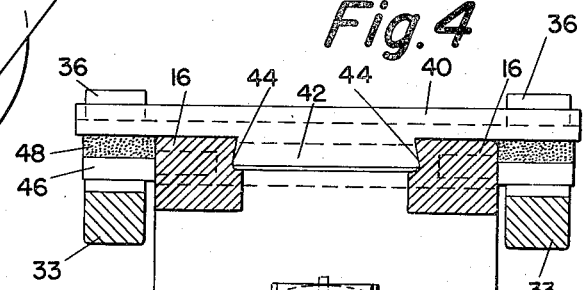
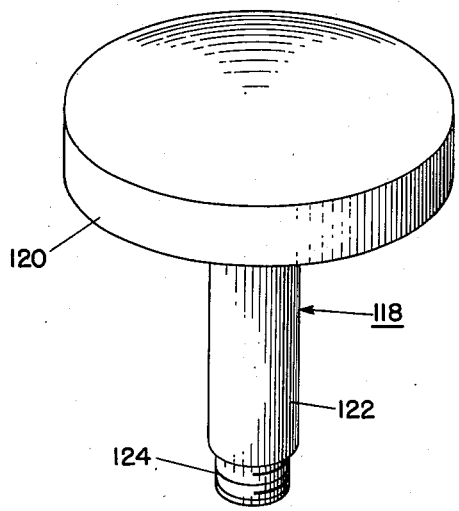
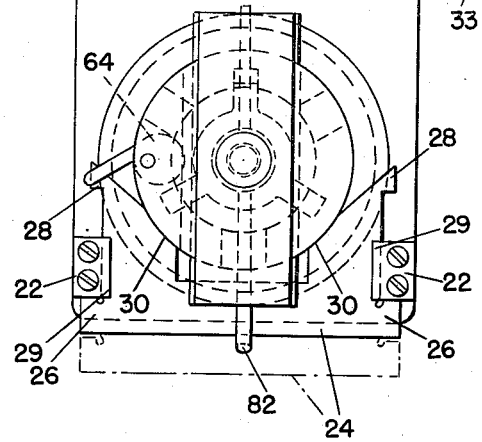
INVENTOR.
MORRIS BERESIN
BY
Caesar and Rivise
ATTORNEYS

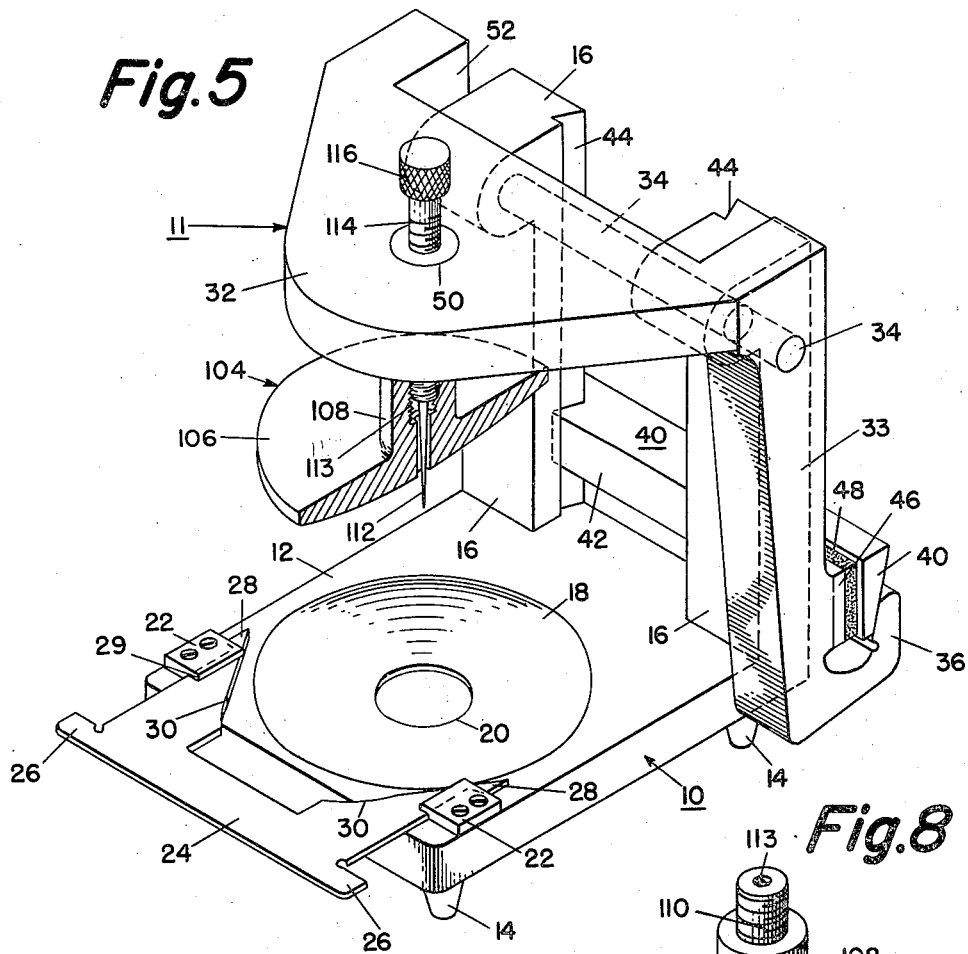

June 16, 1953 M. BERESIN 2,641,838
DENTAL ARTICULATOR
Filed Jan. 22, 1951 4 Sheets-Sheet 4
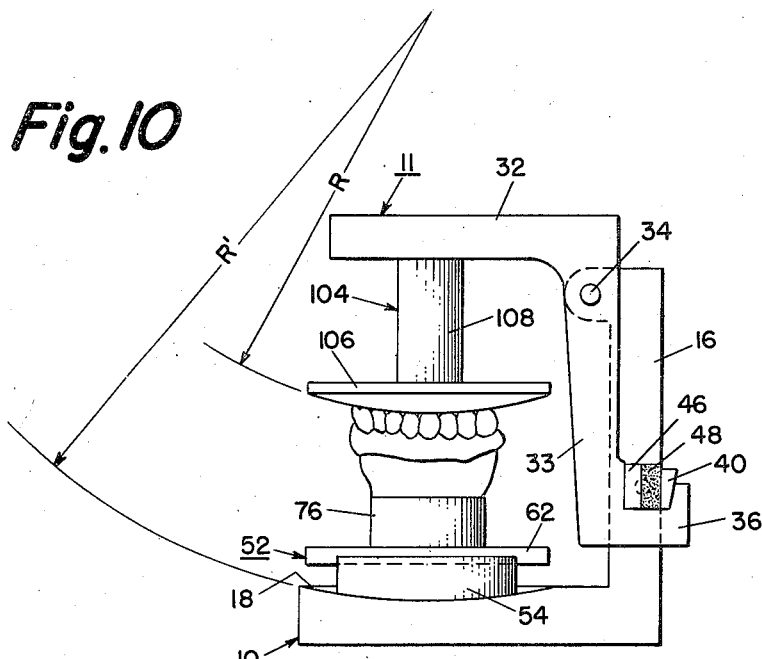
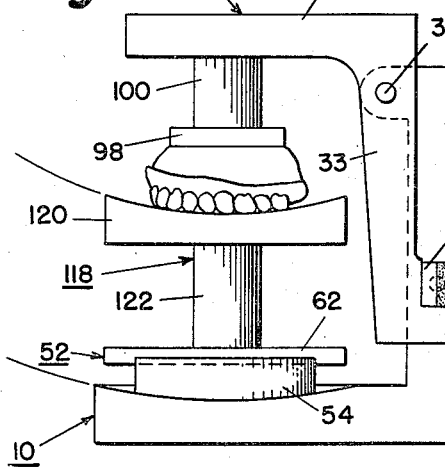
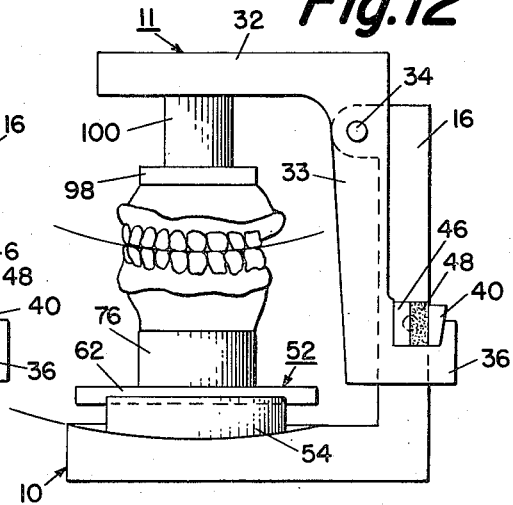
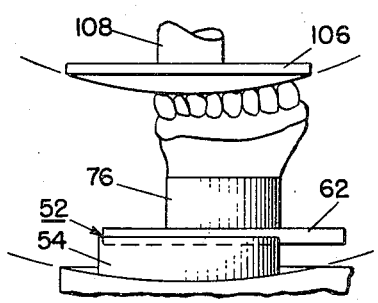
INVENTOR.
MORRIS BERESIN
BY Caesar and Rivise
ATTORNEYS.

Patented June 16, 1953

2,641,838

UNITED STATES PATENT OFFICE 2,641,838

DENTAL ARTICULATOR

Morris Beresin, Philadelphia, Pa.

Application January 22, 1951, Serial No. 207,133

28 Claims. (Cl. 32—32)

This invention relates to dental articulators, and has for its primary purpose the provision of an articulator capable of simulating the normal jaw movements and the contact relations of the teeth in all functional ranges of a dental patient with substantially close accuracy.

It is now generally accepted that the human masticatory apparatus is three-dimensional in its structure and functions, and that in order to provide properly functioning artificial dentures, the dentures must be so constructed as to produce contact of the occlusional surfaces in all functional ranges, i. e. unilateral, bilateral and protrusive balance. Many efforts have been made to construct an articulator on these basic principles but with little success. Accordingly, another important object is to provide an articulator constructed and functioning on these basic principles.

The accomplishment of the foregoing objects is based on the observation that concentric spheres of the same radius are the only curved surfaces which are capable of moving one upon the other so as to keep continuous contact, without becoming dislodged in any of the three dimensions. The structure of the device of the invention is therefore such as to permit the articulation of artificial dentures having occlusal surfaces which conform to concentric spherical surfaces of the same radius, e. g. three and a half to six inches. Such dentures will have balanced occlusion in the mouth of the patient for whom they are made.

The present invention is based in part on the observation or discovery that in order for an articulator to simulate with substantial accuracy the arcuate movement of the mandible and to accurately check the three-dimensional positional and functional relations of the mandible, the elements of the articulator corresponding to the maxilla and mandible of the patient must conform generally both in structure and in function to the maxilla and mandible of the human jaw. Accordingly, another important object of the invention is to provide an articulator in which said elements conform generally to the human maxilla and mandible both in structure and function, and reproduce their relative basic movements in substantially the same way.

To express the same thought in other words, it may be stated that the part of the articulator corresponding to the human maxilla, i. e. the upper bow, is fixed as is the human maxilla, that the part of the device corresponding to the mandible has substantially the movements as are provided by the temporo-mandibular joints of human dentition, that the movement of the mandible into centric relation and occlusion comes from a retrusive position simulating nature instead of from a false protrusive position as in the conventional articulator, and that the articulator of the invention produces the three dimensional movements of the human jaw, i. e. lateral, protrusive-retrusive, and vertical.

The invention is also based in part on the realization that in order for an articulator to function in its intended manner with substantial accuracy, provision must be made to compensate for the resiliency of the tissues and muscles of the human jaw. Hence, another important object is to provide means to simulate the conditions in the human jaw due to the resiliency of the tissues and muscles. This simulation is produced by providing a flexible element in the joint between the parts corresponding to the jaws.

At this point, it may be stated that the articulator of the invention in marked contrast to conventional articulators simulates the actual masticating stroke of the human jaw. This stroke is accomplished by the vertical, retrusive-lateral movements into centric modified by the action of the flexible element between the jaws.

Another object of importance is to provide an articulator in which the functional masticating movements, i. e. protrusive, retrusive, right and left lateral, can be readily regulated and adjusted for specific purposes, and which can be locked in any desired position.

In the articulator of the invention, the functional ranges as well as the masticatory movements can be controlled, regulated or adjusted as required because of specific conditions obtaining in the case of a particular patient such as width of teeth, the amount of overbite and overjet, etc. All the positions of the mandibular part of the device including centric, right and left lateral, protrusive and retrusive can be locked and made fixed for practical purposes.

Another object is to provide an articulator in which the base member maintains a constant identical relationship when the occlusal guides are removed and serves both as the occlusal and incisal guide for the teeth, thereby eliminating the need for the conventional incisal pin guides.

Another object is to provide an articulator, in which the condylar inclination or angulation of the mandibular part can be adjusted if desired, to correspond to condylar registrations obtainable in the mouth.

Another object is to provide means for replacing both models in the articulator in accordance with the original setting.

Another object is to provide an articulator in which the upper bow, which, as above stated, is normally stationary, may be swung out of the way when necessary.

A further object is to provide an articulator having any one or more of the foregoing features and advantages, which is of relatively simple, durable, and sturdy construction, which is considerably more practical than prior art devices and which is particularly suitable for use in the dental office as well as in the laboratory.

Still another object is to provide a practical method for using the articulator of the invention so as to get the full advantage of its structural and functional features.

With the foregoing objects in view, the device of the invention consists essentially of a base member provided with a spherical depression, a lower jaw model support mounted for slidable movement in said depression, and a plate overhanging said base member, both the base member and the overhanging plate being adapted to receive congruent spherical occlusal guides or plaster jaw models.

Referring now briefly to the drawings, wherein is illustrated the presently preferred embodiment of the invention, it will be seen that:

Figure 3 is a plan view;

Figure 4 is a horizontal cross-section taken on line 4—4 of Figure 2;

Figure 5 is a perspective view, the lower denture support being omitted for greater clearness of illustration;

Figure 6 is a perspective view of the movable lower jaw model support;

Figure 7 is a perspective view of the plaster plate used for mounting the lower jaw model, partly broken away;

Figure 8 is a perspective view of the spherical occlusal guide member for the lower denture;

Figure 9 is a similar view of the spherical occlusal guide member for the upper denture;

Figure 10 is a simplified side elevation of the articulator, showing a lower jaw model plastered to its support and a lower denture made in wax against the spherical occlusal guide;

Figure 11 is a view similar to Figure 10, showing an upper denture modeled against its occlusal guide;

Figure 1:
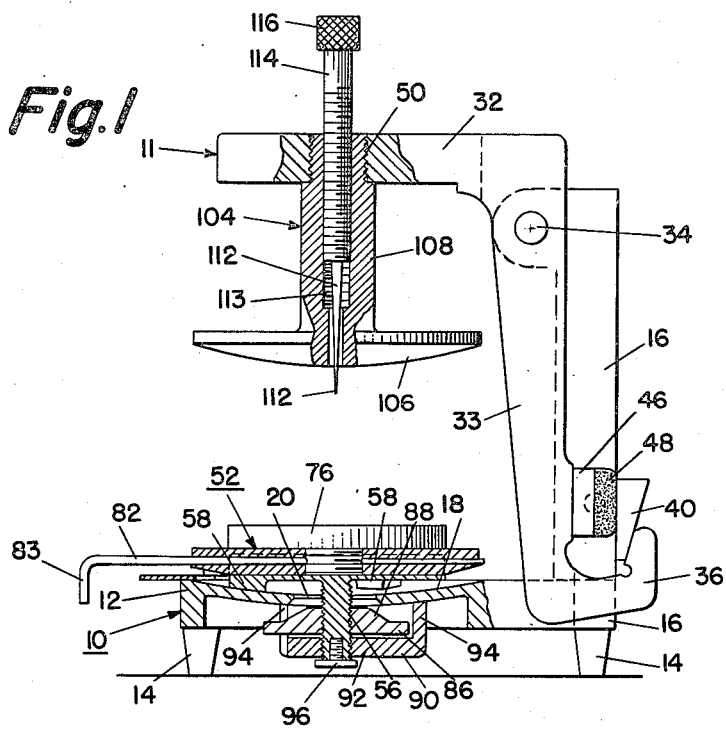
Figure 1 is a side elevation, partly in section and partly broken away, and showing several of the attachments in position for use.

Figure 12 is a similar view showing the two wax dentures of Figures 10 and 11 articulated, preparatory to casting the dentures in their final form; and Figure 13 is a view similar to Figure 10 showing the manner of using the articulator of the invention to adjust the condylar inclination of angulation of the lower denture model with the teeth set up to correspond to condylar registrations obtainable in the mouth.

Referring to the drawings in greater detail and particularly to Figures 1, 2, 4 and 5 thereof, it will be seen that the articulator constituting the preferred embodiment of the invention comprises a base member 10. The base member serves to support the various elements including the upper bow 11, which corresponds to the upper jaw or maxilla and the elements which correspond to the lower jaw or mandible, and which will be later described.

The base member 10 consists of a substantial rectangular plate 12 supported at each corner by a leg 14, and having a vertical post 16 at each of its rear corners. A shallow spherical depression 18 is provided centrally at the forward part of the plate 12. As shown in Figure 1, the under surface of the plate is hollowed out to provide a uniform thickness of material in the region of said depression. A hole 20 is provided centrally of the depression, said hole being chamfered at the bottom.

Secured in any suitable manner to the front corners of the plate are the guiding members 22 for the centric location plate 24, which is slidably mounted on the upper surface of the plate 12. The plate 24 is substantially U-shaped, and is provided with a tab 26 at each end of the bottom of the U, and is also provided with a tab 28 at the distal outer edge of each leg. The guiding members 22 have inwardly facing lips 29, which overhand the outer marginal edges of the legs of the U and serve to slidably guide and retain said plate 24. The tabs 26 limit the rearward movement of the plate, and the tabs 28 limit the forward movement thereof. The inner surfaces of the legs of the U of said plate are cut away to provide the locating edges 30. These edges are arcs of a circle having the same radius as the outer circumference of the spherical depression 18, so that when the plate 24 is in its rearmost position as shown in Figure 4, the center of the circle is concentric with the center of the hole 20.

It will be understood that the centric locating plate 24 provides a means for guiding the lower model support 52 into the center of the spherical depression 18 in the base plate 12. The purpose of this feature is to provide easy reference to the basic position of the models. This position corresponds to the normal position of the patient's mouth at the time bite registrations are made. All mandibular movements originate from this point.

The upper bow 11 consists of a substantially triangular plate 32 overhanging and parallel to the plate 12 of the base member 10. Said triangular plate 32 is provided at each of its rear corners with a depending arm 33, said arms fitting over the outsides of the posts 16 and being pivotedly connected thereto by means of an axle 34, which passes through suitably formed holes near the upper ends of said posts. The lower ends of each of the arms 33 are provided with a rearwardly extending hooklike element 36. These hooks are adapted to receive the locking bar 40, as shown in Figures 1, 4 and 5. It is to be noted that the lock bar 40 is substantially rectangular in shape, but it is provided intermediate the ends on its forward side with a longitudinal projection 42. The inner facing sides of the posts 16 are provided with angular grooves 44 to receive the ends of the projection 42. Two stop members 46 are pivoted to the outer sides of the posts 16, a short distance above the base plate 12. These stop members are advantageously provided with rubber facing pads 48. They may be rotated to present their rubber-faced sides 48 to the depending arms 33 of the upper bow 11. This permits a small over-travel of the upper bow when the arms are pressed against the rubber surfaces 48. This simulates the flexible mandibular joints of the jaw. The dental mechanic may spot grind the occlusal surfaces of the dengreat that the denture models and their supports or the occlusal guides may be accommodated as shown in Figures 10, 11, 12 and 13. It will be understood that the lengths of the two shafts 108 and 122 of the occlusal guides are such that when they are both secured in position to the upper and lower bows respectively, their spherical surfaces will be congruent, as will be the occlusal surfaces of the teeth shown in Figure 12.

The following is a description of the manner in which the articulator may be used:

The dentist takes the impression of both the upper and lower jaws of the patient (edentulous). Models of artificial stone are made of the impressions.

A conventional bite-block of wax is built on the lower model, and a dimensional post is attached thereto at the median line over the ridge.

The physiologic vertical dimension of the patient's jaw is registered on the lower model by raising or lowering the dimensional post, in the usual manner. Then a free-way space is determined by lowering the dimensional post 3 mm. The bite-block now registers both the preliminary and occlusal vertical dimension as well as the centric relationship.

Two pieces of soft wax are placed on the occlusal surface of the lower bite-block, one on each side of the dimensional post. The patient closes his mouth gently until the head of the dimensional post is contacted by the upper ridge. In this manner, the preliminary bite registrations are obtained.

The next step is to determine the patient's occlusal plane. This is done as follows:

The bite-block is removed from the patient's mouth and is placed between the upper and lower models. While holding the models together, a double thickness of soft wax is adapted and carefully molded over the buccal and labial surfaces of the upper and lower models. Then the bite-block with the added wax is removed from the models and placed in the patient's mouth and is trimmed for peripheral comfort and facial contour. The occlusal plane is now indicated on the bucco-labial wax surface by drawing a line from the incisal edges of the lower anterior teeth to the distal occlusal surface of the lower right and left second molars. By means of a sharp instrument a mark is made between the lips at the point which represents the incisal edge of the lower anterior teeth in the normal mouth. A mark is also made at the crest of the retromolar pads at both the right and left sides. These three points when connected by a line indicate the patient's occlusal plane.

The lower bite-block with the registrations, which incorporates the individual centric, vertical dimensions and the plane of occlusion of the patient, will hereinafter be referred as the "blueprint."

This blueprint enables the laboratory to construct base plates having wax occulsal planes with the aid of the articulator of the present invention. The individual physiological bite registrations of the patient are transferred to the articulator and the mechanical functions of the articulator simulating these bite registrations are transferred first to the wax occlusal planes of the base plate and then to the artificial dentures.

This is done in the following manner:

The lower bite-block with the mouth registrations is placed between the upper and lower models. The lower point of a divider with an arbitrary opening is placed on the median point on the line representing the occlusal plane, and a mark is made with the upper point on both the upper and lower models wherever it reaches. The point of the divider is placed in succession at each of the distal ends of the said line, and marks are made on the upper and lower models in exactly the same manner.

The next step is to construct a base plate with a soft wax rim on the upper model. The height of the bite rim is determined by registering the three markings from the model mentioned above on the buccal and labial surfaces of the wax, the divider being used without changing its opening. Then the concave occlusal guide 118 of the articulator is pressed against the soft wax bite rim up to the markings on said bite rim, after which the excess wax is trimmed away.

The lower occlusal guide 118 is now attached to the articulator base by means of the threaded parts indicated at 124 on the guide and 72 on the base member 62. Then the upper model with the newly formed wax occlusal plane is placed on the occlusal guide 118 and positioned centrally by means of the steel point 112. The plaster plate 98 is then threadedly secured to the upper part 32 of the articulator and the model is secured thereto with plaster. The lower model with the blueprint is then aligned and fastened to the upper model and is secured by means of plaster to the element 76 of the base member 52.

It is to be noted that what has been done results in a completed articulation of the upper and lower models according to the blueprint of the preliminary bite registrations. The next step is to complete the lower base plate with the wax occlusal plane. This is done in the same manner as in the case of the upper. The upper model on the articulator is replaced by the upper spherical occlusal guide 106. Then a new base plate with a soft wax bite-rim is constructed on the lower model. The concave surface of the spherical guide 104 is then pressed against the soft wax bite-rim up to the marking made by the same dividers in the same manner as previously done in the case of the upper, and the occlusal surface of the bite-rim assumes a curvature conforming to that of the spherical guide 104. The result is a base plate having a concave spherical occlusal wax surface. The upper occlusal guide 104 is now replaced on the articulator with the upper base plate. The labial, lingual and buccal surfaces of the upper and lower base plates are now trimmed to complement one another. This completes the upper and lower base plates.

The next step is to check and verify the vertical dimension, the centric occlusion, the occlusal plane, the median line, the facial contour, the overjet and in general every proper relationship of the upper and lower occlusal planes in the patient's mouth. This is done by the dentist.

The base plates are sent to the laboratory, where the teeth are set up. These are selected in accordance with approved dental practice. A new base plate is made on the upper model with a rim of soft wax on the ridge and the teeth are set up in alignment with the lower occlusal guide. Then the occlusion is checked and the articulation adjusted against the spherical guide 118 which is placed on the articulator.

The same procedure is followed in setting the lower teeth. They are first set against the wax occlusal plane of the upper base plate for correct position and arrangement and then checked tures to compensate for this natural flexibility of the human jaw.

It is to be noted that the hooklike members 36 are engaged with the locking bar 40 so that the upper bow 11 is held rigidly in the position shown in Figure 1 of the drawing. It is only unlocked to facilitate mounting and unmounting dentures and models. Hence, both the upper and lower parts of the device are normally and positively held in fixed relationship, while the mandibular member, which is the lower model support 52, is manipulated to carry out the purposes of the articulator.

The plate 32 of the upper bow 11 is provided with a threaded hole 50, the axis of which coincides with the axis of the hole 20 in the lower plate 12. The purpose of the hole is to make it possible to secure either the upper spherical guide member or the plaster plate for the upper jaw model to the upper bow 11.

Reference will now be made to Figure 6, which illustrates the movable lower jaw model support, which is indicated generally by the numeral 52. Said element has a disk-like body member 54, having on its under side a threaded locking stem 56 depending from the center and three feet 58 on the periphery thereof. The element 52 is provided on its upper side with a slot 60 having annular sloping sides, giving the bottom of such slots greater width than the top. A slide member 62 having complimentary sloping sides fits into this slot. A cam 64 and a pressure pad 66 are provided on the body 54 to lock the slide member 62 in any desired position. The body member may be calibrated on one side of the slot as at 67 to provide accurate location of said slide member. This controls the amount of inclination of the lower member. A tapered hole 70 is provided through the slide member 62. A cylindrically threaded bore 72 is provided in the middle of the slide member, said bore being longitudinally intersected by the tapered hole 70. The ends of the slide member 62 are tapered as at 74 to prevent interference with the wall of the spherically cavity 18 in the base plate 12.

Reference will now be had to Figure 7, which is a perspective view of the plaster plate for mounting the lower jaw model. The plaster plate, which is indicated generally by the numeral 76, has a substantially cylindrical disk-like portion, provided on its lower surface with a central threaded boss 78 adapted to be received in the bore 72 of the slide member 62 shown in Figure 6. A tapered hole 80 is provided in the boss 78 corresponding to the tapered hole 70 in the slide 62, so that the plaster plate 76 may be rigidly secured to the slide by means of a tapered pin such as the one indicated by 82 in Figures 1 and 2. The pin is provided with a bent outer end 83 to facilitate its insertion and removal. The upper surface of the plaster plate may be provided with grooves or indentations 84 to facilitate securing a plaster denture model of a patient's lower jaw.

Figure 2:
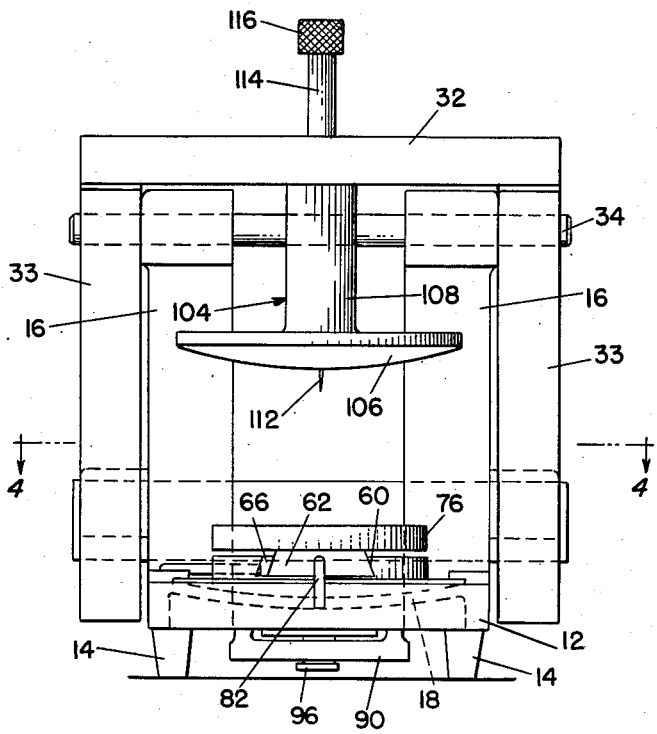
Figure 2 is a front elevation.

The manner of mounting the lower jaw model support 52 is shown in Figures 1 and 2. The support is positioned in the spherical depression 18 of the plate 12 with the locking stem 56 extending down through the hole 20, and a nut 86 is threaded on the stem. The nut has a frustoconical upper portion 88 which advances into the hole 20 as it is rotated on the stem. As previously stated, the hole 20 is chamfered at the bottom. The upper base of the frusto-conical portion of the nut is smaller than the hole 20 and the lower base is greater. Hence, as the nut is advanced on the stem the conical part of the nut gradually comes into contact with the chamfered portion of the hole, and the range of movement of the model support is limited more and more. This provides a means for controlling the scope or latitude of the mandibular movements of the model support on the base 12. The purpose of this control is to increase or decrease the functional range of the dentures. This is reflected in the width of the occulsal surfaces of the artificial teeth.

Means may be provided for locking the lower jaw model support in any desired position within the scope of its movement. This means is illustrated as consisting of a member 90, which has a Y-shaped body 92, and which is provided with a threaded aperture so as to be received on the lower end of the stem 56. Each leg of the Y has an upwardly projecting prong 94, which is adapted to engage the hollowed-out under surface of the plate 12. The lower end of the stem is provided with a threaded aperture which receives a lock screw 96. By tightening the lock screw 96 the support 52 may be secured in any mandibular position within the range of its movement as defined by the nut 86.

The plaster plate for mounting the upper jaw model is shown in Figure 12 by the numeral 98. Said plate, which is provided with indentations (not shown) similar to those in the lower plaster plate 76, is secured to a shaft 100, which is adapted to be received in the threaded hole 50 in the plate 32 of the upper bow 11, as shown in Figure 12.

Figures 8 and 9 illustrate the upper and lower spherical occlusal guide members. The upper guide member, which is denoted generally by the reference character 104, consists of a segment of a sphere 106 secured to a stem or shank 108, the distal or free end 110 of which is threaded so as to be capable of being received within the aperture 50 in the triangular plate 32 of the upper bow 11, as shown in Figures 1 and 2. The upper guide member may, if considered necessary or desirable, be provided as shown in Figures 1 and 2, with a steel point 112 extending through the shaft 108. To this end, the shaft may be provided with an axial threaded aperture 113 for receiving a threaded rod 114. The upper end of the rod is provided with a knurled knob 116, and the steel point 112 is secured to the lower end of the rod, so that the point can be advanced or retracted by rotating the knob. The purpose of the steel point is to facilitate accurate location of the center of the occlusal surface of the lower model on the center of the articulator.

The lower spherical occlusal guide member, shown in Figure 9, is designated by the reference numeral 118, and consists of a concave spherical segment 120 secured to a stem 122. The distal or free end 124 of the stem 122 is threaded so as to be capable of being received within the bore 72 in the lower jaw model support 52.

The radii of the two spherical segments 106 and 120 are the same, and may be between three and a half and six inches, in accordance with the observed fact that in the human mouth the lower teeth move over the occlusal surface of the upper as over the external surface of a sphere having such radius. The radius is indicated by the letter R in Figure 10. In said figure the radius of the spherical depression 18 in the plate 12 is denoted by R'. This radius has the same origin but is substantially greater than R, being sufficiently and verified with the upper spherical occlusal guide 106, as shown in Figure 10. The upper spherical occlusal guide is then replaced by the upper model with the teeth set in wax against the lower teeth as shown in Figure 12. Now that both dentures are in the articulator in proper relationship, the teeth are brought into centric occlusion and from this point the articulator is manipulated and the teeth are guided through each normal function or mandibular movement. If the proper procedure has been followed, there should be no interference during the manipulation of the articulator.

After the dentures are processed and completed, they are replaced in the articulator. The two stop members 46 are rotated to present the rubber facing pads 48 to the depending arms 33 of the upper bow 11 and the teeth are spot-ground, according to the motion created by the flexible joints to compensate for the flexibility of the muscles and tissues.

In the foregoing procedure, the condylar inclination of the individual patient was not taken into account. If it is desired to take this factor into consideration, the lower jaw model after it is plastered to the base 76 is moved rearwardly by means of the slide member 52 as shown in Figure 13 an amount corresponding to the individual condylar inclination as indicated on the scale 67 in Figure 6. The upper jaw model before it is plastered to the upper bow 11 of the apparatus is positioned on the lower model in proper relationship with the wax registration bite therebetween. As a result, the upper jaw model when plastered to the upper bow is offset from the true center or zero of the articulator to the same amount as the lower jaw model, i. e. by an amount equal to the reading on the scale 67. The models are always in this position when mounted on the articulator, and it is in this relationship that the teeth are set up. The occlusal guides, both upper and lower, are always mounted at the exact centre of the articulator, when used to check the occlusal surfaces of the teeth. See Figure 13, wherein the lower jaw model with the teeth set up is shown being checked against the upper spherical guide 104.

The presently preferred embodiment of the invention has been described with the particularity and exactness required by the patent statutes for the purpose of illustration and exemplication. It is to be understood that the foregoing disclosure is not restrictive of the invention, as the disclosed embodiment is subject to considerable variation and modification without departure from the spirit and scope of the following claims.

I claim:

1. A dental articulator comprising a base member provided with a spherical depression for receiving a jaw model support, and a centric location plate mounted for slidable movement on said base member, toward and away from the center of said depression, the inner surface of said centric location plate being on an arc of a circle having the same center as the circumference of the spherical depression.

2. A dental articulator comprising a base member provided with a spherical depression, a lower jaw model support mounted in said depression for slidable movement, and a plate overhanging said base member and adapted to support the upper jaw model, said lower jaw model support being provided with a rearwardly slidable member.

3. A dental articulator comprising a base member, a vertical post at each of the two rear corners of said base member, an upper plate overhanging and parallel to said base member, a depending arm at each of the two rear corners of said upper plate, said arms fitting over the outsides of the aforementioned posts and being pivotally connected thereto, the lower ends of each of said arms being provided with a rearwardly extending hook-like element, and a locking bar received within said hook-like elements.

4. A dental articulator comprising a base member, a vertical post at each of the two rear corners of said base member, an upper plate overhanging and parallel to said base member, a depending arm at each of the two rear corners of said upper plate, said arms fitting over the outsides of the aforementioned posts and being pivotally connected thereto, the lower ends of each of said arms being provided with a rearwardly extending hook-like element, a locking bar received within said hook-like elements, and resilient pads between said locking bar and each of said depending arms.

5. A dental articulator comprising a base member having a concave spherical surface provided with an opening therein, a movable support unit received by the spherical surface of said base member and provided with a stem received by the opening in said base member, said stem cooperating with said opening to determine the range of movement of said support unit on the spherical surface of said base member, and locking means associated with the stem of said support unit.

6. A dental articulator comprising a base member having a concave spherical surface provided with an opening therethrough, a support unit movably received by the spherical surface of said base member and provided with a stem extending through the opening in said base member, said stem cooperating with said opening to determine the range of movement of said support unit on the spherical surface of said base member, and a locking member having a body portion associated with the stem of said base unit and an extending portion adapted to engage the undersurface of said base member for securing said support unit in a predetermined position.

7. A dental articulator comprising a base member having a concave spherical surface provided with an opening therethrough, a support unit movably received by the spherical surface of said base member and provided with a stem extending through the opening in said base member, and a tapered element movably engaging the stem of said support unit and cooperating with the opening in said base member to determine the range of movement of said support unit on the spherical surface of said base member, the range of movement of said support unit being controlled by the positioning of said tapered element on the stem of said support unit.

8. A dental articulator comprising a base member having a concave spherical surface provided with a circular central opening therethrough, a support unit movably received by the spherical depression of said base member and provided with a stem extending through the opening in said base member, and an element having a frusto-conical configuration threadedly engaging the stem of said support unit and cooperating with the opening in said base member to determine the range of movement of said support unit on the spherical surface of said base member, the range of movement of said support unit being controlled by the position of said element along the stem of said support unit.

9. A dental articulator comprising a base member having a concave spherical surface provided with a circular central opening therethrough, said opening between chamfered at the bottom, a support unit movably received by the spherical surface of said base member and provided with a stem extending through the opening in said base member, an element having a frusto-conical configuration threadedly engaging the stem of said support unit and cooperating with the opening in said base member to determine the range of movement of said support unit on the spherical surface of said base member, the range of movement of said support unit being controlled by the positioning of said element along the stem of said support unit, and a locking member having a body portion threadedly engaging the lower portion of the stem of said support unit and a pair of upwardly extending portions adapted to engage the undersurface of said base member when the locking member is advanced on said stem for securing said support unit in a predetermined position.

10. A dental articulator comprising a base member having a concave spherical surface, a support unit movably received by the spherical surface of said base member, and a location plate associated with said base member and movable between first and second terminal positions, said plate when in its second terminal position engaging said support unit for locating said support unit at a predetermined position on said base member.

11. A dental articulator comprising a base member having a concave spherical surface, a support unit having a substantially cylindrical outer surface of predetermined radius movably received by the spherical surface of said base member, and a centric location plate mounted on said base member movable toward the center of the spherical surface of said base member between first and second terminal positions, the inner surface of said centric locating plate being an arc of a circle having a center coinciding with the center of the spherical concave surface of said base member when said plate is in its second terminal position and the same radius as the cylindrical outer surface of said support unit.

12. A dental articulator comprising a base member having a concave spherical surface provided with an opening therein; and a movable support unit having a body portion received by the spherical surface of said base member, a stem received by the opening in said base member, and an offset member movably supported by the body portion.

13. A dental articulator comprising a base member having a concave spherical surface provided with an opening therein; and a movable support unit comprising a body portion having a bottom surface received by the spherical surface of said base member and a top surface, a stem received by the opening in said base member, and an offset member slidably received on the top surface of the body portion of said support unit; said offset member being provided with a threaded opening.

14. A dental articulator comprising a base member having a concave spherical surface provided with an opening therein; and a movable support unit comprising a body portion having a bottom surface received by the spherical surface of said base member and a top surface provided with a groove, a stem received by the opening in said base member, and an offset member slidably received in the groove of said support unit; said offset member being provided with a threaded opening.

15. A dental articulator comprising a base member having a concave spherical surface provided with an opening therein; a movable support unit comprising a body portion having a bottom surface received by the spherical surface of said base member and a top surface provided with a groove, a stem received by the opening in said base member, and an offset member slidably received in the groove of said support unit; said offset member being provided with a threaded opening; and means controllably locking said slidable offset member with the body portion of said support unit.

16. A dental articulator comprising a base member having a concave spherical surface provided with an opening therein; a movable support unit comprising a body portion having a bottom surface received by the spherical surface of said base member and a top surface; a stem received by the opening in said base member, and an offset member slidably received on the top surface of the body portion of said support unit; means controllably locking said offset member with said support unit; and support unit locking means associated with the stem of said support unit.

17. A dental articulator comprising a base member having a concave spherical surface provided with an opening therein; a movable support unit comprising a body portion having a bottom surface received by the spherical surface of said base member and a top surface provided with a groove, a stem received by the opening in said base member, and an offset member slidably received in the groove of said support unit and having a central opening; offset indicating means associated with said slidable offset member; and an offset member locking means.

18. A dental articulator comprising a base member having a concave spherical surface provided with an opening therein; a movable support unit comprising a body portion having a bottom surface received by the spherical surface of said base member and a top surface provided with a groove, a stem received by the opening in said base member, and an offset member slidably received in the groove of said support unit and having a central vertical threaded opening; said offset member being provided with a horizontal opening therethrough intersecting said vertical opening.

19. In a dental articulator comprising a base member having a concave spherical surface; a support unit comprising a body portion having a bottom surface adapted for movement on a concave spherical surface and a top surface; and an offset member movably supported at the top surface of said body portion.

20. In a dental articulator comprising a base member having a concave spherical surface provided with an opening therein; a support unit comprising a body portion have a bottom surface adapted for movement on a concave spherical surface and a top surface provided with a groove, a stem adapted to be received through an opening in said spherical surface, an offset member slidably received in the groove of said body portion and having a vertical threaded opening; and an offset member locking means.

21. In a dental articulator comprising a base member having a concave spherical surface provided with an opening therein; a support unit comprising a body portion having a bottom surface adapted for movement on a concave spherical surface and a top surface provided with a groove, a stem adapted to be received through an opening in said spherical surface, an offset member slidably received in the groove of said body portion and having a vertical threaded opening; said offset member being provided with a horizontal opening therethrough intersecting said vertical opening; and an offset member locking means.

22. In a dental articulator comprising a base member having a concave spherical surface; a support unit comprising a body portion having a bottom surface adapted for movement on a concave spherical surface and a top surface, and an offset member movably supported at the top surface of the body portion of said support unit and provided with a threaded opening; and a model support member comprising a body portion having a top surface adapted to receive a model and a bottom surface, and a threaded stem portion depending from the bottom surface of the body portion of said model support and threadedly engaging the opening in the offset member of said support unit.

23. In a dental articulator comprising a base member having a concave spherical surface; a support unit comprising a body portion having a bottom surface adapted for movement on a concave spherical surface and a top surface, and an offset member movably supported at the top surface of the body portion of said support unit and provided with a threaded opening; a model support member comprising a body portion having a top surface adapted to receive a model and a bottom surface, and a threaded stem portion depending from the bottom surface of the body portion of said model support and threadedly engaging the opening in the offset member of said support unit; and means controllably locking the stem of said model support member in a predetermined position within the opening in the offset member of said support unit.

24. A dental articulator comprising a base member, a vertical post at each of the two rear corners of said base member, an upper plate overhanging and substantially parallel to said base member, a depending arm at each of the two rear corners of said upper plate, said arms fitting over the outside of the aforementioned posts and being pivotably connected thereto, and locking means associated with said vertical posts selectively engaging the lower ends of each of said depending arms.

25. A dental articulator comprising a base member, a vertical post at each of the two rear corners of said base member, an upper plate overhanging and substantially parallel to said base member, a depending arm at each of the two rear corners of said upper plate, said arms fitting over the outsides of the aforementioned posts and being pivotably connected thereto, the lower ends of each of said arms being provided with a rearwardly extending hook-like element, and a horizontal locking bar slidably engaging said vertical posts and received within said hook-like elements.

26. A dental articulator comprising a base member, a vertical post at each of the two rear corners of said base member, an upper plate overhanging and substantially parallel to said base member, a depending arm at each of the two rear corners of said upper plate, said arms fitting over the outsides of the aforementioned posts and being pivotally connected thereto, the lower ends of each of said arms being provided with a rearwardly extending hook-like element, a horizontal locking bar slidably engaging said vertical posts and received within said hook-like elements, and a stop member provided with a resilient facing pad pivotably connected to each of said vertical posts between said locking bar and each of said depending arms, the resilient facing pad of each of said stop members selectively engaging said depending arms by respectively rotating said stop member about its pivotable connection.

27. A dental articulator comprising a base member, a vertical post at each of the two rear corners of said base member, an upper plate overhanging and parallel to said base member, and an occlusal guide depending from said upper plate at a predetermined location comprising a hollow stem, a convex segment of a sphere secured thereto, and a movable rod within said stem having a lower extremity extendable beyond said convex segment.

28. An occlusal guide member for an articulator comprising a hollow stem having an upper extremity adapted to be secured to an articulator and a lower extremity, a body secured to the lower extremity of said stem provided with a lower surface conforming to a segment of a convex spherical surface, a rod threadedly engaging said stem within the hollow portion thereof, and a pointed element axially secured to the lower end of said rod, said pointed element being extendable beyond the lower surface of said guide body by rotating said rod.

MORRIS BERESIN.

References Cited in the file of this patent

UNITED STATES PATENTS

| Number | Name | Date |
|---|---|---|
| 892,040 | Fisher | June 30, 1908 |
| 2,016,103 | Chott | Oct. 1, 1935 |
| 2,097,701 | Pfeiffer | Nov. 2, 1937 |
| 2,270,629 | Fournet | Jan. 20, 1942 |

FOREIGN PATENTS

| Number | Country | Date |
|---|---|---|
| 786,101 | France | Aug. 27, 1935 |